Figure 1:
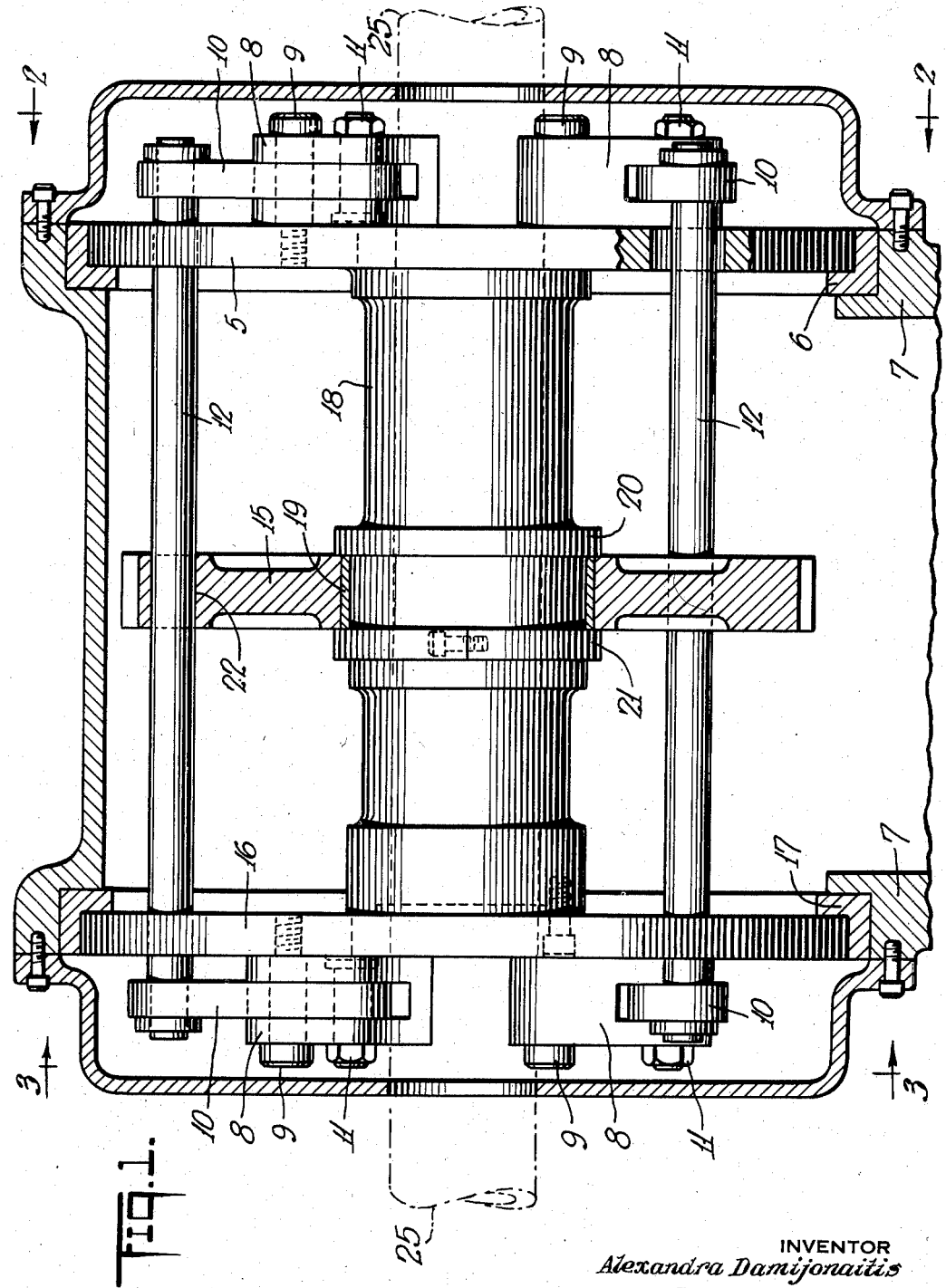

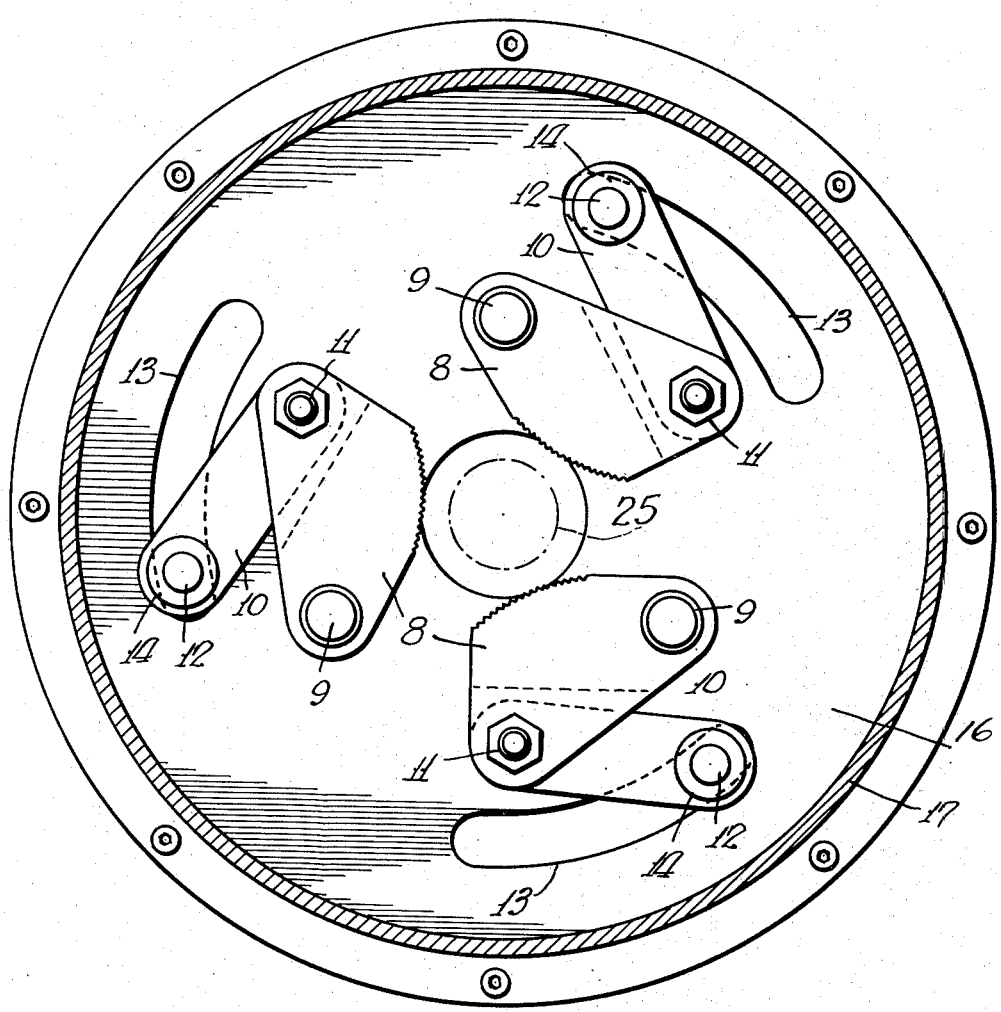

United States Patent Office 2,890,888
Patented June 16, 1959

2,890,888

CHUCK WITH PIVOTED JAWS

Alexandra Damijonaitis, New Britain, Conn., assignor to Union Manufacturing Company, New Britain, Conn., a corporation of Connecticut Application October 2, 1956, Serial No. 613,514

11 Claims. (Cl. 279—35)

My invention relates to a chuck, particularly to a pipe chuck.

It is an object of the invention to provide an improved pipe chuck.

It is another object to provide an improved pipe chuck so arranged as to cause the jaws to bite into the work more deeply as the torque or resistance increases.

Another object is to provide a chuck of the character indicated, which permits of ready embodiment in a double chuck arrangement, wherein two spaced apart chucks are caused to grip the same work piece.

A further object is to provide an improved chuck of the character indicated which is exceedingly simple to manufacture and is composed of very few parts.

Other objects and various features of novelty and invention will be hereinafter pointed out or will become apparent to those skilled in the art.

In the preferred form of the invention, I provide a chuck body having a plurality of jaws mounted preferably pivotally. The jaws are preferably actuated in part by links, one end of each link being connected to a jaw while the other end of the link is moved by a link actuator and is constrained to move along a path so that the jaw is moved in one direction, preferably the gripping direction. The link actuators may be moved by hand, but are preferably moved by power means arranged about the axis of the chuck so as to cause the link actuators to move bodily about the axis of the chuck. In a preferred form, or when desired, I provide a pair of chucks, preferably similar but reversed with respect to each other and arranged at a distance from each other so as to grip a work piece, such as a pipe, at two separated points while the link actuators are preferably common to links for both chucks and are actuated by a common means. Such a means may be a hand wheel, but in the preferred form, consists of a gear or sprocket which may be power operated.

In the drawings, which show for illustrative purposes, only a preferred form of the invention:

Fig. 1 is a central vertical sectional view of a chuck embodying my invention.

Figure 2:
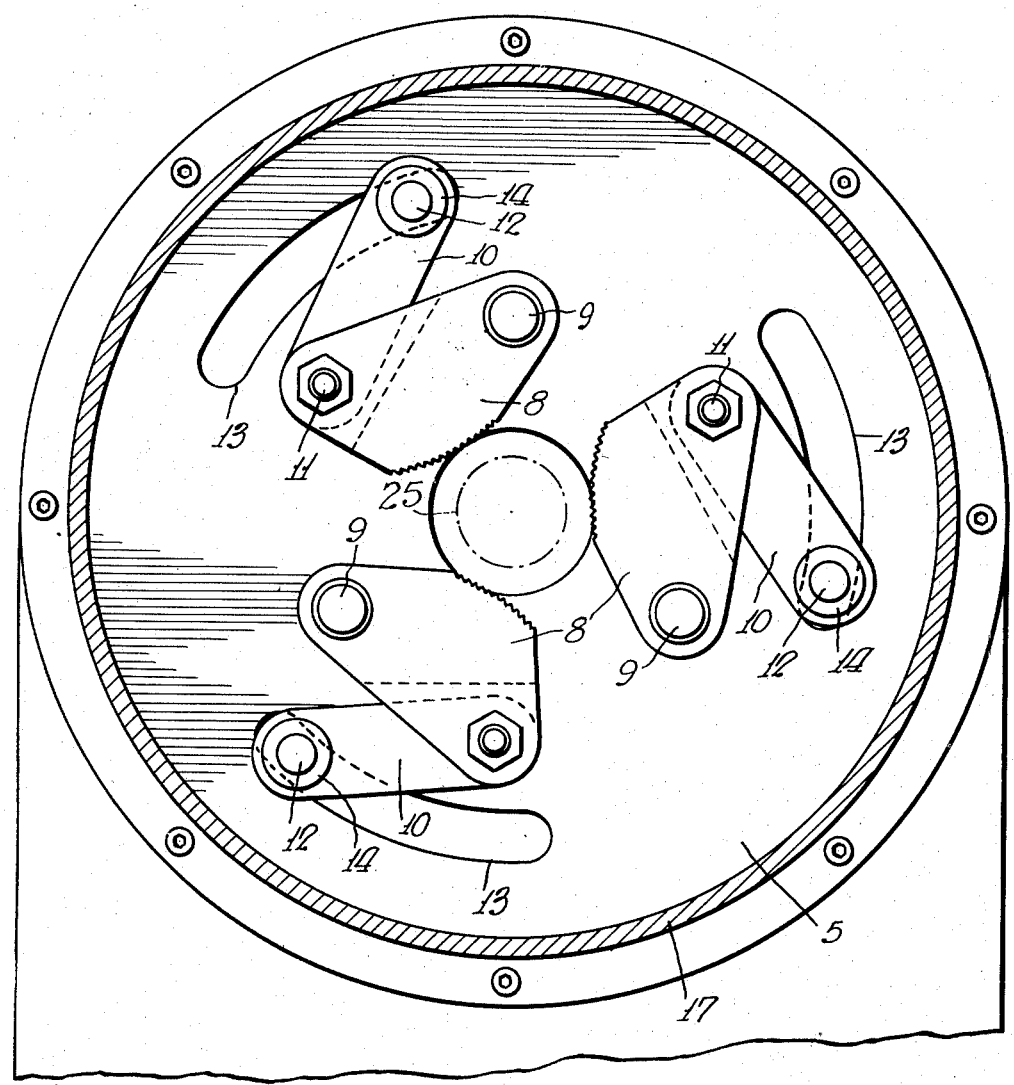

Figs. 2 and 3 are views, taken substantially in the planes of the lines 2—2 and 3—3, respectively, of Fig. 1.

In the form shown, there is a chuck body 5 mounted for rotation in a bearing 6 in a frame or support 7. This chuck body 5 carries a plurality of jaws 8—8 which are preferably pivoted to the chuck body as by means of screws 9, or the like. In the particular form shown, each jaw is split or bifurcated and in the bifurcation receives one end of a link 10. Each link at one end is secured to the jaw, preferably pivotally, as by means of a screw or bolt 11 extending through the bifurcated end of the jaw and through one end of the link. The opposite end of each link is constrained to move in a path such as to swing the jaws about their pivots.

In the form illustrated, the links are connected at the opposite ends, that is the ends opposite the jaws, to link actuators 12. The said opposite ends of the links 10 are constrained to move by the link actuators in paths preferably arcuate so that when the said opposite ends of the links are moved in that constrained path, the jaws 8 are swung about their pivots into gripping position. In the particular form illustrated, the link actuators extend through arcuate slots 13—13 in the chuck body 5 and are pivotally connected to the said opposite ends of the links and preferably held as by means of nuts, washers, or the like 14. The link actuators 12 may be moved by a hand wheel, or the like, but in the form shown, the link actuators are connected to a gear or sprocket 15 pivotally mounted in relation to the chuck body 5 so as to move relatively thereto. Thus, as the gear 15 is rotated in one direction, the said opposite ends of the links are constrained to move in accordance with movement of the gear. The arcuate paths 13 in the chuck body 5 may also act as guides to constrain the links to swing the jaws in the jaw closing direction. Relative movement of the gear 15 in the opposite direction, of course, will move the jaws in chuck opening direction. It will thus be seen that I provide a very simple pipe chuck and the parts are all of simple construction. The jaws are actuated by heavy forces of a wedging or toggle nature so as to more tightly grip the work as the resistance or torque on the work increases.

In the preferred form of the invention shown, the improved chuck is a double chuck involving two chucks at spaced apart points, both gripping the same work piece such as the pipe shown. In the particular form illustrated, there is a second chuck body 16 mounted for rotation in a bearing 17 in the frame 7 heretofore noted. The chuck bodies 5 and 16 are secured to what may be termed a tubular spindle portion 18 so that the spindle portion and the chuck bodies rotate together and are in effect one piece. The link actuators 12 extend through both chuck bodies 5—16, just as illustrated in Figs. 2 and 3, as has been already described in connection with the chuck 5 at the right hand side of Fig. 1. The parts of the chuck 16 at the left hand side of Fig. 1 are for the most part preferably duplicates (but with reverse mounting) of those shown in the chuck 5 at the right, no special description need be given of those shown at the left.

In the form illustrated, the gear 15 is mounted on a bearing 19 on the spindle portion 18 and is held between a flange shoulder 20 and a split ring 21, or the like, as will be understood. The link actuators, in the form shown, extend through apertures such as 22 in the gear or sprocket 15, and consequently when the latter rotates relatively to the chuck bodies, the link actuators are carried around by the gear or sprocket and carry the ends of the links in definite paths to actuate the jaws. The arcuate slots at 13, as heretofore described, may also act to constrain the movement of the link ends. Thus, the orientation of jaws 8 in both chucks 5—16 will assure simultaneous grip of both chucks on stock 25, for counterclockwise movement of actuators 12 in the sense of Fig. 2, and for clockwise movement of actuators 12 in the sense of Fig. 3.

It will be seen, therefore, that my improved pipe chuck may be arranged as a single chucking unit, as first described, or as a double chucking unit, as last described, and may be operated by the same means in either case.

The chuck is driven by the power gear 15, the link actuators 12, the links 10, jaws 8 and body 5 or 5 and 16.

While the invention has been described in detail for the preferred form illustrated, it is to be understood that various changes may be made within the scope of the invention as defined in the appended claims.

I claim:

1. In a chuck, a chuck body, a jaw pivotally mounted thereon, a link connected at one end to said jaw, said body having a guide slot therein, a link actuator extending through said guide slot and constrained to move therein along the path on said guide slot, said link actuator being connected to the opposite end of said link, whereby movement of said link actuator in said slot will cause said jaw to move about its pivot.

2. In a chuck, a chuck body, a plurality of jaws movably mounted on said body, a link connected to each jaw at one end of each link, said body having a plurality of arcuate slots therein, link actuators extending through said slots and being constrained to move therein, said link actuators being connected to the opposite ends of said links, and means for moving all said link actuators in said slots and thereby moving said jaws.

3. In a chuck, a rotatable spindle portion, a chuck body at each end of said spindle portion and rotatable therewith, each of said chuck bodies having a chuck jaw movably mounted thereon, a link connected to each jaw at one end of said link, a link actuator extending from one chuck body to the other and secured to the opposite ends of said links, and means for constraining said link actuator to move in a predetermined path to cause said links to move said chuck jaws.

4. In a chuck, a spindle portion, a chuck body at each end of said spindle portion, a plurality of chuck jaws pivotally mounted on each chuck body, links connected at one of their ends to each of said chuck jaws, link actuators extending from one body to the other, said chuck bodies having guide surfaces for guiding said link actuators in a predetermined path, said link actuators being connected to the opposite ends of said links, and means for moving said link actuators relatively to said chuck bodies for moving said chuck jaws.

5. In a chuck, a spindle portion, chuck bodies carried by said spindle portion, chuck jaws pivotally mounted on said chuck bodies, links connected at one end to said jaws, link actuators extending from one chuck body to the other and connected to the opposite ends of said links, said chuck bodies having arcuate slots for the passing and constraining guidance of said link actuators, and means for moving said link actuators in paths about the axis of said chuck bodies.

6. In the combination defining claim 5, said means for moving said link actuators comprising a gear connected to said link actuators.

7. In a chuck, a spindle portion, chuck bodies secured to said spindle portion and rotatable therewith, chuck jaws pivotally mounted on said chuck bodies, links connected at one end to said chuck jaws, link actuators extending between said chuck bodies and connected to the opposite ends of said links, said chuck bodies having arcuate slots for the passage of said link actuators, a gear rotatably mounted on the spindle portion of said chuck, said gear being secured to said link actuators, whereby upon rotation of said gear said link actuators will move so as to swing said other ends of said links to move said chuck jaws.

8. In a chuck, a spindle portion, chuck bodies secured to said spindle portion and rotatable therewith, chuck jaws pivotally mounted on said chuck bodies, links connected at one end to said chuck jaws, a rotatable member rotatably mounted on said spindle portion, link actuators for said links and connected to the ends of said links opposite said jaws, said link actuators being connected to and driven by said rotatable member and constrained thereby to move in arcuate paths and swing said links to move said jaws about their pivots upon rotation of said rotatable member about its axis.

9. In a chuck, a chuck body, a jaw pivotally mounted thereon, a link connected at one end to said jaw, a gear concentric with said chuck body and rotatable relatively thereto, a link actuator connected to said gear and to the opposite end of said link, whereby rotary movement of said gear relatively to said body will move said other end of said link to swing said jaw about its pivot on said body.

10. In a chuck, a chuck body, means for rotatably supporting the same, a plurality of chuck jaws movably mounted on said body, a link for each jaw and connected at one end to its jaw, a driving member for said chuck and rotatable slightly relatively thereto, means for connecting the opposite end of each link to said driving member, whereby upon movement of said driving member relatively to said chuck body each said link will move its jaw on said body, and thereafter said driving member will drive said chuck body through said links and jaws and body.

11. In a chuck, a chuck body, means for rotatably supporting the same, jaws movably mounted on said body, links each connected at one of its ends to a jaw, a drive gear for rotating said chuck body and mounted for limited rotation relatively to said body, means for connecting the other ends of said links to said drive gear, whereby when said drive gear is rotated with a work piece between said jaws, said drive gear will first rotate relatively to said chuck body to move said links to move said jaws into engagement with the work piece and further rotation of said drive gear will cam said jaws to engage said work piece more forcibly and rotate said chuck body through said links and jaws and body.

References Cited in the file of this patent

UNITED STATES PATENTS

| | | |
|---|---|---|
| 1,446,060 | Pratt | Feb. 20, 1923 |
| 1,488,221 | Swissgobel | Mar. 25, 1924 |
| 1,745,158 | Fish | Jan. 28, 1930 |
| 1,833,601 | Batterman et al. | Nov. 24, 1931 |
| 2,444,457 | Marks et al. | July 6, 1948 |
| 2,535,599 | Preston | Dec. 26, 1950 |
| 2,776,842 | Marsden | Jan. 8, 1957 |